United States Patent [19]
Brody et al.

[11] Patent Number: 4,921,333
[45] Date of Patent: May 1, 1990

[54] PHASE CONTRAST IMAGE MICROSCOPY USING OPTICAL PHASE CONJUGATION IN A HYBRID ANALOG/DIGITAL DESIGN

[75] Inventors: Philip S. Brody, Bethesda; Charles Garvin, Adelphi, both of Md.

[73] Assignee: The United States of America as represented by the Secretary of the Army, Washington, D.C.

[21] Appl. No.: 296,555

[22] Filed: Jan. 11, 1989

[51] Int. Cl.$^5$ .................. G02B 27/00; G03H 1/02
[52] U.S. Cl. ............................. 350/320; 350/3.64
[58] Field of Search .............. 350/320, 3.64, 3.62, 350/162.13, 163, 3.82

[56] References Cited

U.S. PATENT DOCUMENTS 3,672,776  6/1972  Brooks.
4,721,362  1/1988  Brody et al. .................. 350/320

OTHER PUBLICATIONS

Hoffman et al., "Modulations Contrast Miscroscope", Applied Optics, vol. 14, No. 5, May 1975, pp. 1169-1176.
Siegman, "Dynamic Interferometry and Differential Holography of Irregular Phase Objects Using Phase Conjugate Reflection", Optics Communications, vol. 31, No. 3, Dec. 1979, pp. 257-258.
Feinberg, "Self-Pumped, Continuous-Wave Phase Conjugator Using Internal Reflection", Optics Letters, vol. 7, No. 10, Oct. 1982, pp. 486-488.
Axelrod, "Zero-Cost Modification of Bright Field Microscope for Imaging Phase Gradient on Cell: Schlieren Optics", Biophysics, vol. 3, 1981, pp. 167-173.
Brody et al., "Intensity Imaging of a Phase Object and Autocorrelation Using a BaTiO$_3$ Optical Phase Conjugator", SPIE Proceedings, vol. 754, Jan. 13-15, 1987, pp. 194-201.
Brody et al., "Grating Evolution and Form in a Single--Crystal Self-Pumped Barium Titanate Phase Conjugator", SPIE Proceedings, vol. 739, Jan. 14-16, 1987, pp. 50-57.
Brody et al., "Dynamic Holographic Method of Imaging Phase Objects", Applied Optics, vol. 26, No. 5, Mar. 1987, pp. 913-916.
Brody et al., "Microscopy Using Optical Phase Conjugation in a Hybrid Analog/Digital System", SPIE Proceedings, vol. 901 Image Processing, Analysis, Measurement, and Quality, Jan. 13-15, 1988, pp. 119-126.

Primary Examiner—Bruce Y. Arnold
Assistant Examiner—Loha Ben
Attorney, Agent, or Firm—Saul Elbaum; Guy M. Miller

[57] ABSTRACT

A method for producing an intensity contrast image from phase detail in a transparent phase object also removes spurious background artifacts and speckle from the light source resulting in clearer images. A laser beam or other coherent light source is directed through the transparent phase object and focused into a photorefractive hologram recording crystal where a temporary volume phase hologram is formed. Once the hologram has formed a phase conjugate beam is created and passes back through the transparent phase object and is directed to an apparatus which records an intensity background pattern consisting of coherent artifacts. The transparent phase object is then mechanically shifted or allowed to move on its own in the case of transparent living specimens. The light source is directed through the physically translated transparent phase object and focused into the photorefractive hologram recording crystal. Another phase conjugate beam, of the original unshifted phase object, is created and passes back through the physically translated transparent phase object and is directed to the apparatus which records the intensity image due to the phase conjugate of the original optical field passing through the physically translated phase object. The intensity pattern containing the background coherent artifacts is then subtracted from this intensity image which also contains the same background artifacts, resulting in an intensity image of the transparent phase object without coherent artifacts.

11 Claims, 2 Drawing Sheets

PHASE CONTRAST IMAGE MICROSCOPY USING OPTICAL PHASE CONJUGATION IN A HYBRID ANALOG/DIGITAL DESIGN

RIGHTS OF THE GOVERNMENT

The invention described herein may be manufactured, used and licensed by or for the Unites States Government for Governmental purposes without payment to us of any royalty thereon.

BACKGROUND OF THE INVENTION

1. Field of the Invention

The present invention relates to a method and apparatus for producing an intensity contrast from phase detail in a transparent phase object. More particularly, the invention pertains to a method and apparatus for enhancing the "gradient" intensity image through the use of a subtraction process.

2. Description of the Prior Art

Prior methods for producing phase gradient intensity images from transparent phase objects have been fully described in U.S. Pat. No.: 4,721,362 to Brody et al., assigned to the U.S. Government and is hereby incorporated by reference. In this method a beam of collimated coherent light is produced and directed through a transparent phase object. The beam of collimated coherent light, after it has passed through the transparent phase object, is directed to photorefractive holographic means for producing and recording a hologram such that the phase conjugate beam of the transparent phase object is generated from the hologram. The position of the transparent phase object is shifted, and the phase conjugate beam of the transparent phase object, after it has passed through the shifted transparent phase object, is directed to means for observing the intensity image of the component of the spatial derivative of optical phase retardation in a particular direction. The photorefractive holographic means for producing and recording a hologram in this method may comprise a photorefractive hologram recording crystal. This crystal may comprise an oriented crystal of barium titanate in the form of a parallelpiped.

The hologram is produced by passing the input coherent optical field through the specimen and into the crystal. The formation time is dependent on the input optical power. The time is characteristically several seconds at the 200-mW power levels. Once formed, the hologram updates as the input changes. Updating occurs with relative rapidity, with lags of only a fraction of a second between input and formation.

The phase conjugate of the transmitted original optical field is produced when the hologram (within the crystal) is illuminated by an input coherent field from the laser. This phase conjugate field propagates from the crystal and passes back through the specimen. The consequence of the backward passage through the original phase distorting object is the removal of the phase distortions. The input optical field is the coherent output of a laser. The phase fronts are planes, and the intensity distribution is Gaussian. As a result, the back-propagating field after its passage through the original (unshifted) phase-distorting specimen does not contain intensity features other than those found in the original Gaussian input. However, when the subject through which the phase-conjugate field passes is not the original subject, but the original subject shifted transversely, then there will be intensity features in the back-propagating field. These will depend on the magnitude of the shift.

The problem with generating intensity images by this method is that the images include intensity mottling and spurious unchanging background patterns from the coherent light source. These spurious patterns degrade the gradient image formed purely by the shifted specimen.

Another disadvantage to the prior art method is that it is cumbersome if not impossible to use when trying to image naturally moving specimens. The prior art also produces only images related to the gradient of phase retardation in the shift direction. It is sometimes desirable to produce images related more closely to the total phase change due to transmission rather than the aforementioned phase gradient images.

SUMMARY OF THE INVENTION

Accordingly, it is an object of the present invention to provide a method and apparatus for viewing intensity images that do not contain spurious unchanging background images on patterns generated from the coherent light source.

It is another object of the present invention to provide a method and apparatus for forming intensity images of naturally moving phase objects and also to produce these images without spurious coherent backgrounds.

It is still another object of the present invention to produce images related to phase retardation rather than phase gradient and to produce these images without spurious unchanging background.

It is still a further object of the present invention to provide a method for viewing intensity images that do not contain spurious unchanging background patterns without the necessity of specimen and slide removal.

The image forming process of the present invention is dependent on the formation of a temporary reference hologram in a single crystal of barium titanate. The hologram is produced by passing a laser beam through a specimen and into the crystal. The hologram is a volume phase structure in which the formation is the result of an optical feedback phenomenon called self-pumping. The hologram is continually updated, adjusting to specimen motion and other changes. This same beam produces a new beam which propagates back through the specimen and into a microscope objective. The new beam is the phase conjugate of the input into the crystal. When it passes back through the refractive specimen the distorting effects of the specimen remove the distortion in the wave fronts which were the result of the initial passage through the specimen. The phase fronts are again plane as they were in the original input into the specimen. There are now no intensity patterns in the back-propagated beam and no image can be viewed. However, it takes a certain amount of optical energy and therefore time to update the hologram. Therefore, shifting the specimen quickly results in the backward passage of the phase conjugate of the original phase fronts, through a now shifted object. The result is not a featureless beam with plane wave fronts but one containing phase patterns and intensity patterns. Such patterns must clearly depend upon the magnitude and direction of the shift or to other movements of the specimen.

If the shift is in the plane of the phase object and is small and the specimen viewed is in slight defocus using the objective, there shows the gradient phase image. If the shift is perpendicular to the plane of the essentially planar object then an image is produced which will show details of total phase retardation rather than gradients in the shift direction. In both cases intensity objects also appear but in slight defocus.

If the slide viewed in slight defocus is not shifted and remains stationary, but component phase elements of the specimen move or otherwise change, there is again an intensity image although the relation between the image and the phase retardation produced by the moving specimen is more complex than that produced by a small shift in a particular direction. Because it is produced as a result of the objects own motion or changes, the image shows only the changing phase elements and the stationary phase background is rejected.

If the specimen and slide are stationary and consist of intensity objects within phase distorting material, the effect of the phase conjugation in the microscope arrangement is to remove the distorting effects of the phase distorting material surrounding the inclusions.

In all of the above mentioned situations, because of the coherence of the laser light, the direct optical images contain characteristic coherent artifacts and other spurious background images. These background artifacts can be eliminated by digitally implemented subtractive processing. A video camera may be used to convert the images to electronic outputs for use by a processor. The processor is used to capture and store the original intensity pattern of the optical field which contains the coherent artifacts and capture and store the phase contrast image which appears only momentarily after the shift, and also any intensity image. The first image is then subtracted from the second image forming a clear artifact free image, for example one showing phase gradient or for example one showing phase contrast.

This method of producing an artifact free laser light image is particularly effective because there is, initially proceeding a shift, no intensity patterns except for those produced by coherent effects. The image showing phase detail appears only with the shift. The subtractive processing thus removes only artifacts such as laser field speckle and interference fringes from reflection off surfaces of the slide on which a specimen is mounted. Any variations in artifacts and intensity pattern resulting from adjustment of the optical system or the illumination system or for other reasons are automatically taken into account since the optical field carrying this pattern is captured only a small fraction of a second proceeding the shift producing the image showing phase detail. Note, in particular that since it starts with the slide in situe it takes into account artifacts which result from the reflective surface of the slide such as fringes.

DESCRIPTION OF THE PREFERRED EMBODIMENTS

Figure 1:
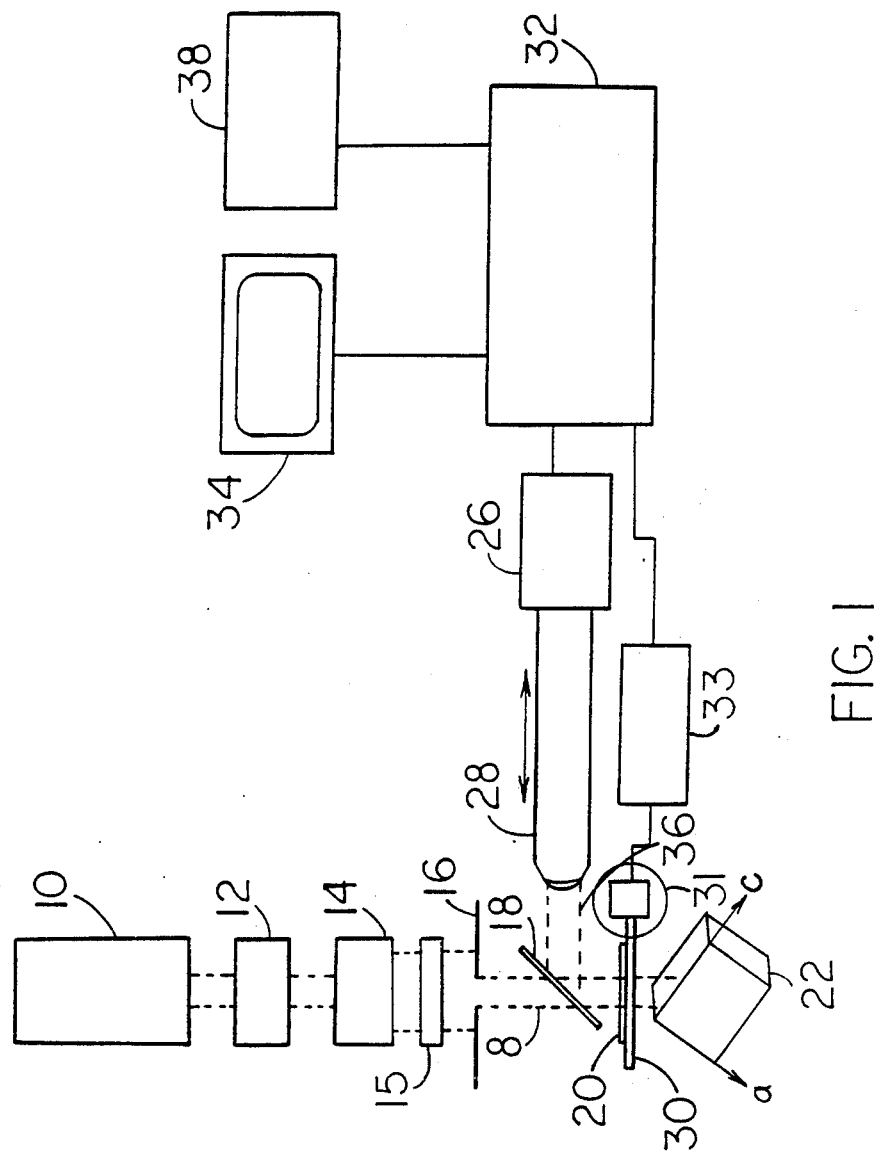
FIG. 1 shows a schematic of the basic arrangement of components according to an aspect of the invention.

A schematic of the microscope processor is shown in FIG. 1. A coherent optical source may be an expanded beam 8 from an argon ion laser 10 that has passed through a polarization rotator 12, beam expander 14, shutter 15 and aperture 16. The expanded beam 8 is passed through the aperture 16 so that only the central 0.4 cm is transmitted. The beam intensity is roughly 200 mW/cm$^2$ in the expanded beam. The expanded and apertured beam 8 is transmitted through a beam splitter 18 to a specimen mounted on a slide 20. After passing through the specimen, the phase distorted beam 24 falls directly on the face of a photoreflective holographic crystal of barium titanate 22. The polarization of the light lies in the c-a plane of the crystal 22. The crystal 22 is rotated so that the beam 24 enters the crystal 22 at a 45 degree angle to the positive c-axis. It is well known that this configuration results in efficient hologram formation and a maximum amplitude phase conjugate reflection.

A microscope has an objective 28 focus light from the near-field gradient imaging plane, creating a primary optical which can be magnified by an ocular (not shown) and projected onto the detection video camera 26. The position of the observing microscope is manipulated by a focus adjustment. Various working distance objectives with standard power designations of 4x and 32x can be used.

Specimens are placed on standard slides 20 held vertically in a conventional positioner 30. The positioner 30, slide and all, can be shifted in any combination of three orthogonal directions with translator (stepping motor) 33 capable of shifting in small incremental shifts on the order of 1 micrometer steps. Contrast showing phase gradients in transverse directions images are produced by transverse shifts. Shifts normal to the plane produce another kind of contrast. These show actual phase contrast rather than phase gradient contrast. Shift increments can be specified. Quasi-continuous shifts can also be produced at variable shift repetition rates. Shifts are in the plane normal to the direction of the input beam. The entire arrangement can be placed on a turntable 31. The turntable 31 allows the slide to be rotated so that its surface normal is at an angle to the beam. This prevents specularly reflected light from entering the microscope objective 28. The path of the phase conjugate reflection, however, is the exact reverse of the input. The phase conjugate beam 36 passes back through the slide 20 and into the objective 28 after being reflected by the beamsplitter 18.

The video output of the vidicon camera 26 passes through a digital image processor 32 with the processor 32 acting as a user interface. The microscope objective is operated by menu driven software which stores selected images on disk. A control signal synchronized with the processing software triggers the stepping motor 33 which translates the specimen slide 20. In the digital processing, the video signal from the camera 26 is digitized to eight-bit resolution and stored in an image memory plane (512×512 bits). The initial digitized image (before the shift) is subtracted from a second digitized image produced when the phase-conjugate field passes back through the shifted object. The resultant image can be viewed on a monitor 34. A recorder 38, for example a VCR, may be used to store the information.

The shift of the specimen is made in a time short compared to the lifetime of the holographic structure in the crystal. The light passing through the shifted slide is reflected by the hologram within the crystal 22 as the phase conjugate of the optical field that entered the crystal 22. This optical field passes back through the shifted specimen to create the observed intensity patterns.

To produce this intensity image the object is viewed in slight defocus. If the objective was focused so that light only from the object plane was imaged, there would be not intensity images observed even after the shift. Variations of intensity produced by passage through a phase plate vanish in the plane of the object itself and thus intensity variations due to the changes in phase due to the passage of the original phase conjugate through the displaced or changed plate also vanishes in that plane. For this reason the objective is focused on a plane slightly displaced where variations in phase produce variations in intensity. These look like the variations in phase allowing us to produce these differences or phase gradient images. In practice phase objects are not ideally so thin. The object does not lie in one plane. When one focuses on one plane an adjacent plane in the object is slightly out of focus. Also, light from an imaging system does not come from one plane only as out of focus planes are also imaged (the lens has a depth of focus). As a consequence one has a choice as to where the focus as in conventional microscopy and there is not one focus for which entire images vanish. The images that appear show contrast for moving phase objects but also contain coherent artifacts and stationary background and moving background due to intensity modulation.

In the absence of a shift, the intensity pattern in the back-propagating beam is essentially a spurious background characteristic of laser light. This intensity pattern is removed by the subtraction. The remaining intensity image, that results from the shift, is the image that is displayed. The function of the computer is to capture the original optical field which contains the coherent artifacts, then capture the phase gradient image which appears only momentarily after the shift, store this two, and subtract from the phase gradient intensity image the coherent artifact intensity pattern. The resulting image shows a clear artifact free image.

The subtraction algorithm can be implemented on, for example, a Trapix digital image processor with Fortran programs which use Fortran callable subroutines provided by the company. Recognition Concepts Inc. The image processor uses a pipeline configuration. Among the plumbing tasks are setting the digitizer levels and thresholds. Trapix supplies programs to do this, to initialize the processor, and to drive the mathematical units in the processor. It is necessary for the user to set up command files and main programs to use the software supplied. A default configuration is chosen (in this case, the digitizer is set to accept video data from zero to one volt, and linearly digitize it into 256 equal levels) for the digitizer, and a command file is written to run the supplied programs with the chosen values. The command file also runs the device initialization routine to clear all memory registers, and to synchronize the image processor to the camera sync waveform. The command file also runs a thresholding program which sets up a lookup table for the subtracted data to pass through, and the default thresholding levels (in this case, anything below $-20$ is set to zero or black, anything above $+20$ is set to 256 or white, and anything in between $-20$ and $+20$ is left unchanged) are set. The command file then runs one of the main programs which are described below.

One main program is a menu driver, which prompts the user for the instruction to continue subtracting, or to exit the program. It uses three memory plane in the Trapix image processor. Each memory plane is $512 \times 512$ pixels by 8 bits deep. The program clears all registers, digitizes a video frame from the camera into frame buffer 0, sends a control signal out to control the sample shifting device (either stepping motors or piezo electric movers can be used), skips one frame of video data, digitizes the next frame of video, and subtracts this frame from the one stored. It stores the result of the subtraction into memory plane 1, and displays it to the screen 34. The program skips the next frame of data, and asks the user if he wants to continue or quit.

The next main program performs a continuous subtraction using a method similar in essence as described above, but for the step which asks for user input.

As previously mentioned motion may be controlled by stepping motors or piezoelectric actuators. During the running of the computer subtraction program, the computer sends a control signal to the stepper or actuator control circuitry. In the case of piezoelectric stepper motors, high resolution small motion control is obtained in the object plane of the microscope. The range of motion of the piezoactuators is continuous from small fractions of a micrometer to 5 micrometers as the voltage of the control signal varies form 1 to 5 volts. Response time of the piezoelectric device is on the order of 10 msec. which would allow as high a rate of motion as 100 Hertz.

The present invention can also produce images which show only moving elements in a phase object and do not include stationary phase objects. This is done by viewing of the optical field backpropagating through the phase object by viewing a plane just displaced from the plane of the object. In other words, the object plane is viewed in slight defocus. If the phase objects do not move or change then there is no intensity patterns anywhere in the backpropagating beam, including patterns in those planes displaced from the object plane, for such patterns have been removed by the double pass, that is by the effect of the passage of the phase conjugate fronts back through the plate that produced the fronts that were phase conjugated. The phase images become visible because the reconstructed phase conjugate optical field at a time t is passed through the object which has changed, that is the object at a time t+s, where s is the time interval during which the change has occurred.

For moving or changing objects the contrast depends on the difference between the phase retardation pattern produced by the phase object at the time when initial passage through the plate produced the initial hologram which forms the backpropagating optical field, and the changed phase retardation pattern at the time of the backward passage, the result of the motion of the phase objects and perhaps process induced changes in refractive index. The contrast also depends on the hologram rewrite time, that is the time it takes to replace the old hologram with a new hologram. Where the changes are produced by the motion of objects moving at velocity v, the contrast depends not only on the difference of the two patterns due to motion but also on the rewrite time. For instantaneous rewrite contrast vanishes. As the rewrite time increases contrast increases. The rewrite time is a characteristic of the recording crystal and of the energy flux into the crystal that was absorbed to produce the photorefractive hologram. For changes which occur in a time small compared to the rewrite time there is visualization of motion or otherwise induced refractive changes. These images can be viewed directly or recorded at a fixed frame rate and processed by continuously subtracting preceding frames from subsequent frames. This eliminates all stationary background including coherent artifacts.

The rewrite time with continuous laser illumination can be considerably less than a characteristic time for a change. Consequently, the contrast produced by slow changes, for example slow motions, can be inadequate for viewing or processing. Therefore, for such slow changes a shutter placed along the beam path after the expander 14 can be used, and if necessary reduced illumination power subsequent to forming a reference phase conjugating hologram. This is done so as to extend the life time of the hologram which has extended lifetime in the dark or when illuminated only with reduced illumination.

To produce an image due to slow changes a first reference phase conjugating hologram is formed by illuminating the recording crystal until a phase conjugate beam is returned. The shutter is then closed leaving the crystal in the dark. A sufficient time is given for the desired change to occur. The hologram is then illuminated with a beam through the object the intensity of which is reduced so that the new pattern has a minimal effect on the recorded hologram. The phase conjugate of the original field now passes through the changed phase plate, producing a phase contrast image indicative of the change. A series of such images can be produced.

As described hereinabove, to remove coherent artifacts and stationary modulations of intensity the initial optical field is obtained using the video camera to load into the processor memory a digital representation of the pattern of the initial optical field. This initial intensity pattern is then subtracted from the subsequent images. A series of coherent artifact free images can be produced from a series of images which result from changes in the phase and intensity due to changes in the object. A series of such images can be restored using a time lapse video recorded and played back in normal time to produce a time lapse presentation of slow changes.

Figure 2:
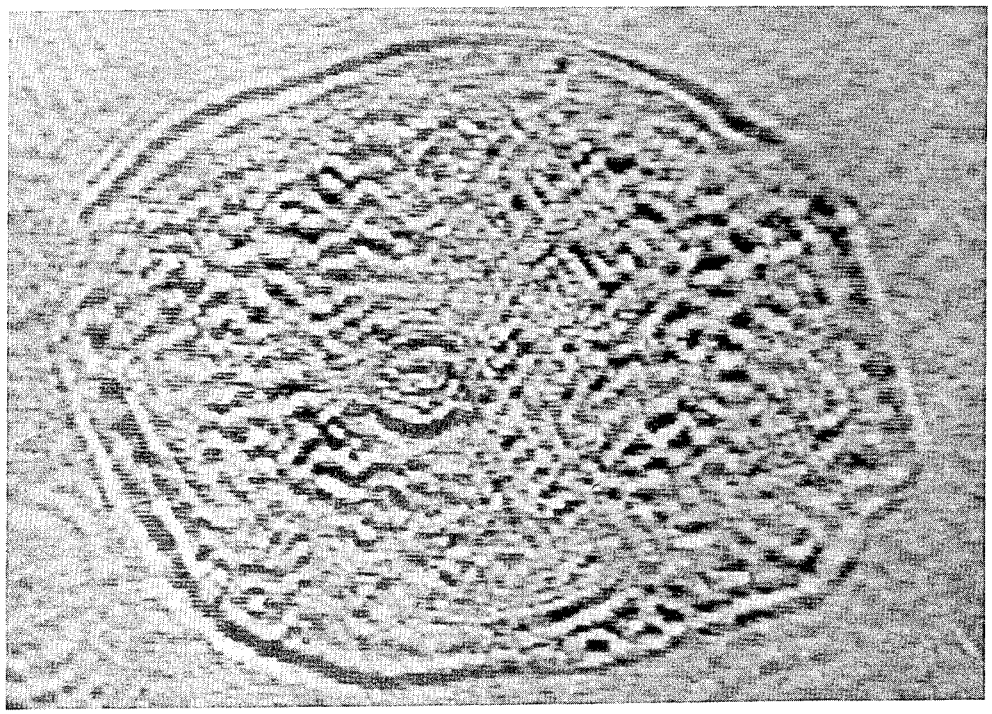
FIG. 2 shows a representation of the intensity image obtained by a downward displacement of an exfoliated cheek cell in which the field of view is approximately 50 micrometers wide.
Figure 3:
FIG. 3 shows a representation of the intensity image obtained of self moving single celled protista (paranema) in which each protista is approximately 30 micrometers long.

Examples of non-moving and moving specimens are shown in FIGS. 2 and 3. An example of a non-moving specimen is shown in FIG. 2 which shows an exfoliated human cheek cell. The nuclear sheath, material within the sheath, the cell membrane, and cytoplasmic granules are clearly visible. The shift direction was down in relation to the top of the object which is located adjacent the top of the photograph of FIG. 2. Changing the shift direction produces different images, and additional structural detail can often be found by imaging with a number of differently directed shifts. An example of a self moving specimen is shown in FIG. 3 which shows mobile single celled protista of the genus paranema. While the images shown in FIGS. 2 and 3 were generated using a helium cadmium laser at 441.6 nm and about 100 mW/cm$^2$ results could be obtained using the full range of available lines from the deep blue to the green.

We wish it to be understood that we do not desire to be limited to the exact details of the present method of producing an intensity image without spurious background artifacts and speckle as the concept of subtracting out the cluttering images can be accomplished by a variety of techniques to those skilled in the art and still fall within the scope of the appended claims.

What is claimed is:

1. A method for producing an intensity image from details of optical phase retardation in a particular direction from a transparent phase object without spurious background artifacts and speckle from laser illumination comprising the steps of:
   producing a beam of collimated coherent light;
   directing said beam of collimated coherent light through a transparent phase object substantially located on a plane;
   directing said beam of collimated coherent light, after it has passed through said transparent phase object, to real time photorefractive holographic means for producing and recording a hologram of said transparent phase object and for generating a phase conjugate beam of said transparent phase object from said beam of collimated coherent light;
   directing said phase conjugate beam back through said transparent phase object to an image forming means;
   position said image forming means to observe the image in the back of or forward from said plane, close to the transparent phase object, but not in the plane of the object, sufficiently far back or forward for obtaining an intensity pattern containing coherent artifacts;
   recording said intensity pattern;
   producing a physical translation in the position of the transparent phase object;
   directing said beam of collimated coherent light through said physically translated transparent phase object;
   directing said beam of collimated coherent light, after it has passed through said physically translated transparent phase object, to said real time photorefractive holographic means for generating another phase conjugate beam of said transparent phase object;
   directing said another phase conjugate beam of said transparent phase object through said physically translated transparent phase object;
   directing said another phase conjugate beam of said transparent phase object, after it has passed through said physically translated transparent phase object, to said image forming means for obtaining an intensity image;
   recording said intensity image;
   subtracting said intensity pattern from said intensity image forming a difference intensity image; and
   viewing said difference intensity image, whereby said difference intensity image is generated without spurious background artifacts and speckle.

2. The method of claim 1, wherein said image forming means comprises:
   a microscope; and
   a video camera for viewing said difference intensity image.

3. The method of claim 1, wherein said photorefractive holographic means comprises a photorefractive hologram recording crystal.

4. The method of claim 3, wherein said photorefractive hologram recording crystal comprises an oriented crystal of barium titanate.

5. The method of claim 1, wherein said step of producing a physical translation in said transparent phase object comprises incrementally shifting the position of said transparent phase object.

6. The method of claim 5, wherein said incremental shifting is preformed within the plane of the transparent phase object.

7. The method of claim 5, wherein said incremental shifting is performed perpendicular to the plane of the transparent phase object.

8. The method of claim 1, wherein said step of producing a physical translation in said transparent phase object comprises waiting an interval of time to allow changes in said transparent phase object to occur.

9. A method for producing a intensity image from details of optical phase retardation without spurious background artifacts and speckle from laser illumination comprising the steps of:
generating a laser beam;
expanding said laser beam by means of a beam expander;
opening a shutter disposed in the path of said expanded laser beam;
splitting said expanded laser beam into first and second beams, after said expanded laser beam passes through said shutter, by means of a beam splitter;
directing said first beam through a transparent phase object substantially located on a plane;
focusing said first beam, after said first beam passes through said transparent phase object, into a photorefractive hologram recording crystal that records a hologram after a certain write time has elapsed and generates a phase conjugate beam of said transparent phase object;
directing said phase conjugate beam back through said transparent phase object to an image forming means;
positioning said image forming means so that an intensity pattern is formed;
recording said intensity pattern;
closing said shutter once said intensity pattern has been recorded;
waiting an interval of time to allow changes in said transparent phase object to occur;
opening said shutter, for a time short compared to said write time, so that said first beam from said beam splitter is directed through said changed transparent phase object into said photorefractive hologram recording crystal, such that another phase conjugate beam of said transparent phase object is produced traveling in the opposite direction of that of said first beam;
directing said another phase conjugate beam back through said changed transparent phase object to said image forming means so that an intensity image is formed;
recording said intensity image;
subtracting said intensity pattern from said intensity image forming a difference intensity image; and
viewing said difference intensity image whereby said difference intensity image showing change in optical phase retardation is generated without spurious background artifacts and speckle from said laser beam.

10. The method of claim 9, wherein
recording of said intensity image is repeated at said interval of time forming a series of intensity images of said changed transparent phase object; and
subtracting of said intensity pattern is performed on each of said series of intensity images forming a series of difference intensity images.

11. A method for producing an intensity image from details of optical phase retardation in a particular direction from a moving or changing phase object without spurious background artifacts and speckle from laser illumination comprising the steps of:
producing a beam of collimated coherent light;
directing said beam of collimated coherent light through a transparent phase object substantially located on a plane;
directing said beam of collimated coherent light, after it has passed through said transparent phase object, to real time photorefractive holographic means for producing and recording a hologram of said transparent phase object and for generating a phase conjugate beam of said transparent phase object from said beam of collimated coherent light;
directing said phase conjugate beam after it passes back through said transparent phase object to an image forming means;
positioning said image forming means to observe the image in the back of or forward from said plane, close to the transparent phase object, but not in the phase of the object, sufficiently far back or forward for obtaining an intensity image;
recording said intensity image at a fixed rate forming a series of intensity image frames;
subtracting each preceding intensity image frame from each subsequent intensity image frame forming a series of difference intensity images; and
viewing said series of difference intensity images, whereby said difference intensity images are generated without spurious background artifacts and speckle.

* * * * *